US008701735B2

(12) United States Patent
Klabunde et al.

(10) Patent No.: US 8,701,735 B2
(45) Date of Patent: Apr. 22, 2014

(54) COIL FOR A WINDING-UP DEVICE

(75) Inventors: Olaf Klabunde, Giengen (DE); Joachim Clabunde, Heubach (DE); Juergen Blickle, Goeppingen (DE)

(73) Assignee: C. & E. Fein GmbH (DE)

( * ) Notice: Subject to any disclaimer, the term of this patent is extended or adjusted under 35 U.S.C. 154(b) by 329 days.

(21) Appl. No.: 12/628,672

(22) Filed: Dec. 1, 2009

(65) Prior Publication Data

US 2010/0133373 A1 Jun. 3, 2010

(30) Foreign Application Priority Data

Dec. 1, 2008 (DE) ......................... 10 2008 060 803

(51) Int. Cl.
*B32B 38/10* (2006.01)

(52) U.S. Cl.
USPC ........... 156/762; 156/717; 156/927; 156/939; 242/125.1; 242/597.2; 242/597.3; 242/597.6; 242/601; 242/608.6; 30/116; 83/651.1

(58) Field of Classification Search
USPC ............... 156/717, 762, 927, 939; 242/597.1, 242/597.2, 597.3, 597.6, 601, 608.6, 118.1, 242/118.3, 125.1; 83/651.1
See application file for complete search history.

(56) References Cited

U.S. PATENT DOCUMENTS

| | | | | |
|---|---|---|---|---|
| 2,763,957 | A * | 9/1956 | Roberts | 43/57.1 |
| 3,905,561 | A | 9/1975 | Kelch et al. | |
| 4,227,517 | A * | 10/1980 | Aguiar | 602/9 |
| 4,281,806 | A * | 8/1981 | McMullen | 242/125.1 |
| 4,423,609 | A * | 1/1984 | Itoh | 68/212 |
| 4,571,278 | A | 2/1986 | Kunert | |
| 4,726,179 | A * | 2/1988 | Smith et al. | 57/129 |
| 5,477,709 | A * | 12/1995 | Rowe | 68/212 |
| 5,718,108 | A * | 2/1998 | Oppl et al. | 57/132 |
| 5,803,396 | A | 9/1998 | Dewaele | |
| 6,163,964 | A * | 12/2000 | Calcinai | 30/347 |
| 6,616,800 | B2 * | 9/2003 | Eriksson | 156/714 |
| 6,820,838 | B2 * | 11/2004 | Martin et al. | 242/588.1 |
| 2002/0121330 | A1 | 9/2002 | Eriksson | |
| 2002/0195511 | A1 * | 12/2002 | Heesch | 242/322 |
| 2003/0136868 | A1 * | 7/2003 | Carlebach et al. | 242/322 |
| 2007/0214649 | A1 | 9/2007 | Hess | |
| 2008/0053052 | A1 * | 3/2008 | Cigarini | 56/12.7 |

FOREIGN PATENT DOCUMENTS

| | | | |
|---|---|---|---|
| DE | 289746 | A5 | 5/1991 |
| DE | 202006011634 | U1 | 9/2006 |
| DE | 102006013417 | A1 | 9/2007 |
| DE | 102007060432 | A1 | 6/2009 |
| EP | 0121480 | A1 | 10/1984 |
| FR | 2223294 | A1 | 10/1974 |
| FR | 2463088 | A1 | 2/1981 |
| GB | 2017634 | A | 10/1979 |
| WO | 2004103748 | A1 | 12/2004 |

* cited by examiner

*Primary Examiner* — Mark A Osele
(74) *Attorney, Agent, or Firm* — St. Onge Steward Johnston & Reens LLC

(57) ABSTRACT

The invention discloses a coil for a winding-up device adapted for winding up a cutting wire used for cutting through an adhesive bead of a bonded-on pane, having a coil body for winding up the cutting wire, the coil body being provided with at least one opening for securing one end of the cutting wire.

20 Claims, 4 Drawing Sheets

COIL FOR A WINDING-UP DEVICE

BACKGROUND OF THE INVENTION

The present invention relates to a coil for a winding-up device adapted to wind up a cutting wire used for cutting through an adhesive bead of a bonded-on pane, having a coil body for coiling up the cutting wire.

The invention further relates to a device adapted to cut through an adhesive bead of a bonded-on pane, having a motor-driven winding-up device that comprises a coil for taking up a cutting wire used for cutting through an adhesive bead of the pane.

Windshields of modern vehicles are firmly connected with a body flange, which forms a frame for the pane and which extends all around its periphery, by an adhesive bead consisting of a polyurethane adhesive or another suitable adhesive. The adhesive bead consists of a particularly strong material so that the adhesive, together with the windshield, increase the mechanical stability of the vehicle. It is understood that the high strength and toughness of the adhesive make the operation of cutting through the adhesive a relatively difficult task.

However, as windshields have to be exchanged relatively frequently, due to rockfall or other damage, there must be available for every vehicle type a suitable device by which the windshield can be removed.

DE 10 2006 013 417 A1 discloses a device and a method for cutting through the adhesive bead of a bonded-on pane. In the case of that device, a cutting wire is initially introduced into a gap between the pane and the body flange, is then guided around the adhesive bead, whereafter a first end of the cutting wire is fastened, preferably outside of the vehicle, for example on the wiper shaft, the second end of the cutting wire is passed through the adhesive bead and is fastened on a winding-up device, and the adhesive bead is cut through by the cutting wire as it is wound up using the winding-up device.

Such a device for cutting through the adhesive bead of windshields generally uses a cutting means in the form of a cutting wire. The cutting wire normally consists of steel and may have a circular, a square, a triangular cross-section or a cross-section of any other shape. However, throughout this application the term "cutting wire" also encompasses cutting wire made from materials other than metal, such as plastic material. Further it may also be made up of a plurality of filaments like a rope etc. Further, the surface of the cutting wire may be provided with a suitable coating or with other surface features, such as abrasive particles, to support the cutting operation.

Now, when a cutting wire of that kind is used in combination with a winding-up device it is necessary, in order to guarantee its rapid and long-term use, that the cutting wire can be easily fastened on, and can be wound up by the winding-up device. In addition, when the cutting wire is configured as a metal wire, it is necessary to consider its considerable stiffness in order to prevent it from getting stuck or entangled on the winding-up device.

SUMMARY OF THE INVENTION

It is a first object of the invention to disclose a coil for use in a winding-up device for winding up a cutting wire which is particularly suited for cutting through an adhesive bead of a glued-on pane.

It is a second object of the invention to disclose a coil for a winding-up device for winding up a cutting wire in a simple and time-saving cutting operation.

It is a third object of the invention to disclose a coil for use in a winding-up device for winding up a cutting wire that allows for an easy handling.

These and other objects of the invention are achieved by a coil for a winding-up device adapted for winding up a cutting wire used for cutting through an adhesive bead of a glued-on pane, having a coil body for winding up the cutting wire which is provided with at least one opening for taking up one end of the cutting wire.

The object of the invention is thus perfectly achieved. The invention allows a cutting wire to be quickly fixed on the coil by introducing one end of the cutting wire into the opening of the coil body and by then operating the winding-up device. The cutting wire can then be fully loaded for cutting through the adhesive bead of the pane, after only a few revolutions of the coil body.

The opening in the coil body may be configured, for example, as a cylindrical opening or as a slot.

The form of the coil body as such is of no importance with respect to the function of having the cutting wire taken along by the opening.

In its simplest form, the coil body may be cylindrical, for example, and may have a bore for taking along one end of the cutting wire. Alternatively, the coil body may be passed by a slot-like opening, for example.

Advantageously, however, the coil body comprises a plurality of segments which together form an outer contour suitable for receiving the wound-up cutting wire and between which at least one space is formed.

In that case, one end of the cutting wire can be introduced into one of the spaces so that the end of the cutting wire can be easily introduced into and mounted on the coil body.

According to an advantageous further development of that embodiment, the coil body comprises a plurality of web-shaped segments that are arranged, in radial direction, at equal angular spacings one relative to the other along a circle concentric to the axis of rotation of the coil.

This makes fixing of one end of the cutting wire on the coil body especially easy and quick because the end can be introduced into any of a plurality of spaces between the web-like segments, irrespective of the angular position of the coil body. When the winding-up device is then actuated, the cutting wire is taken along on the coil body in a simple and safe way.

According to a further embodiment of the invention, the coil body consists of at least two parts that can be connected one with the other.

This provides particular advantages with respect to handling of cutting wire with a relatively high inherent stiffness, i.e. such consisting of wire, for example. In that case, detaching and mounting the coil body, together with the cutting wire, from or on a coil axis can be made especially easy. Also, production advantages can be achieved as the coil body can be produced more easily in that case. Optionally, the elements can be connected mechanically, for example by screwing. Alternatively, however, the different parts of the coil body may also be detachably connected one with the other.

According to a further embodiment of the invention, the coil body has two flanges that define a coil chamber intended to receive the wound-up cutting wire.

According to another embodiment of the invention, the coil comprises a detachable cover.

This feature has the effect to secure the cutting wire wound up on the coil. And easy accessibility is facilitated as well.

According to another embodiment of the invention, the coil comprises a coil axis on which the coil body is detachably fastened.

In this way, the coil body can be mounted on or removed from the coil axis together with the wound-up cutting wire. This provides the advantage that the cutting wire can be removed from the winding-up device together with the coil body, for example for disposal. It is not necessary in this case to remove the entire winding-up device from the working zone.

According to another embodiment of the invention, the coil comprises a coil axis on which a cover is mounted.

It is possible in this way to protect the material wound up on the coil body.

According to another embodiment of the invention, there is provided on the coil axis a preferably spring-loaded locking mechanism for the cover.

According to a still further preferred embodiment, a preferably spring-loaded locking mechanism is provided on the coil axis for fixing the coil body on the coil axis.

These features guarantee especially high comfort in operation of the coil as both the cover and the coil body can be easily connected with, or detached from, the coil axis.

According to a further embodiment of the invention, the locking mechanism that serves to fix the coil body and the cover on the coil axis coact in such a way that the coil body can be detached from the coil axis together with the cover.

The arrangement preferably is such that after release from the coil axis a two-part coil body can be opened.

These features provide the advantage that the coil body can be fixed on, or detached from, the coil axis together with the cover and the wound-up material received on it. Once the coil body and the cover have been detached from the coil body, the two-part coil body can be opened to get access to the cutting wire wound up on the body.

It is understood that the coil according to the invention, together with a cutting wire wound up on the coil body, may be used in combination with a suitable winding-up device also as an exchangeable cartridge.

Further, the invention provides a device for cutting through the adhesive bead of a bonded-on pane, having a motor-driven winding-up device that comprises a coil or cartridge according the invention intended for receiving a cutting wire for cutting through the adhesive bead as the cutting wire is wound up.

It is understood that the features of the invention mentioned above and those yet to be explained below can be used not only in the respective combination indicated, but also in other combinations or in isolation, without leaving the scope of the invention.

BRIEF DESCRIPTION OF THE DRAWING

Further features and advantages of the invention will become apparent from the description that follows of certain preferred embodiments, with reference to the drawing. In the drawing

DESCRIPTION OF PREFERRED EMBODIMENTS

Figure 1:
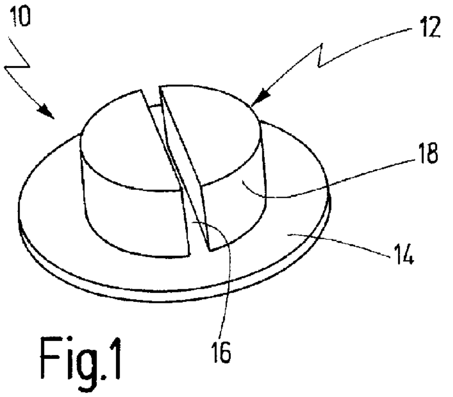
FIG. 1 shows a first embodiment of a coil according to the invention with a cylindrical coil body passed by a slot.

FIG. 1 shows a simple basic shape of a coil according to the invention, indicated generally by reference numeral 10. The coil 10 comprises a cylindrical coil body 12 that is passed in radial direction by a slot-shaped opening 16. The coil body 12 therefore consists of two segments 18 that are separated one from the other by the slot-like opening 16. The coil body 12 is limited on its one end by a disk-shaped flange 14. A disk-shaped flange provided on the opposite end has been omitted in FIG. 1 for the sake of greater clarity.

The slot-like opening 16 facilitates the process of threading in one end of the cutting wire and of then winding up the latter by operation of an associated winding-up device on which the coil body 12 is received. The width of the opening 16 is such that it is somewhat larger than the width of the cutting wire to be taken up so that the cutting wire can be threaded in easily and will be taken along immediately when the winding-up device is operated. The cutting wire has a cross-section only slightly smaller than the width of the opening. Ideally, the cross-section is large enough to just permit the cutting wire to be introduced, but maximally so large that after introduction the cutting wire will be bent off.

Bending the cutting wire off outside the perimeter of the coil body will hold the cutting wire on the coil body in a first step, when the winding means is operated for the first time after the threading-in operation. That way of holding the cutting wire on the coil body suggests itself especially when the cutting wire is configured as a wire because in that case the wire will be bent off.

However, when instead of being configured as a wire, the cutting wire consists of a plastic material, additional measures will sometimes be required for fixing the cutting wire on the coil body 12. In that case, one may make use, for example, of a loop fastened on an associated element, for example a web.

FIGS. 2 to 9 show a number of alternative embodiments of the coil, indicated generally by reference numerals 10*a* to 10*h*.

Figure 2:
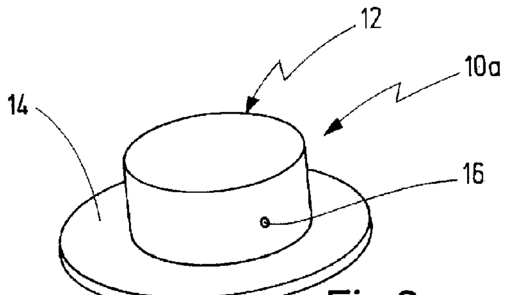
FIG. 2 shows a second embodiment of a coil according to the invention with a cylindrical coil body in which an opening is disposed for receiving one end of the cutting wire.

In the case of the coil 10*a* according to FIG. 2 the coil body 12 also has a cylindrical shape. But instead of a slot-like opening 16, there is provided a cylindrical opening or bore 16.

Figure 3:
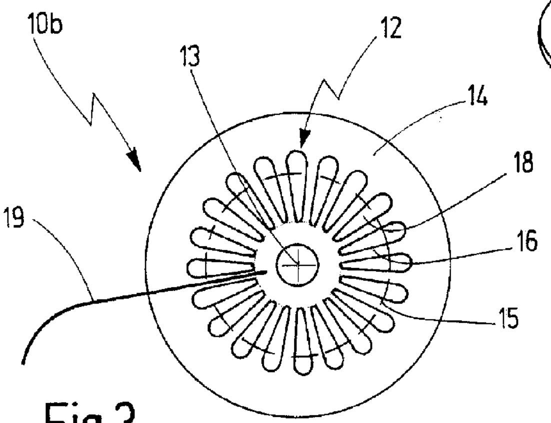
FIG. 3 shows a particularly preferred embodiment of a coil according to the invention with a plurality of separate segments between which spaces are formed for receiving one end of the cutting wire.

In the case of the embodiment shown in FIG. 3, indicated generally by 10*b*, the coil body 12 consists of a total of twenty segments 18 arranged at uniform angular spacings one relative to the other along a circle 15 concentric to the axis of rotation 13 of the coil 10*b*. The segments 18 get wider from the center toward the outside, in wedge-like form, and end near the center and on the outside by rounded portions. Between the segments 18, there are formed spaces or openings 16 the gap size of which is adapted to the thickness of the cutting wire 19 so that, for example, a cutting wire having a thickness of less than 1 mm can be introduced. The outer circumference of the segments 18 forms the coil body surface on which the cutting wire 19 can be wound up.

While the exact details of the configuration and of the surface of the coil body 12 do not really matter, it is important that at least one opening 16, or a space, be formed between the different segments 18 for introduction of the cutting wire 19.

FIGS. 4 to 9 show only some of a plurality of imaginable variants of the configuration of the coil body 12.

Figure 4:
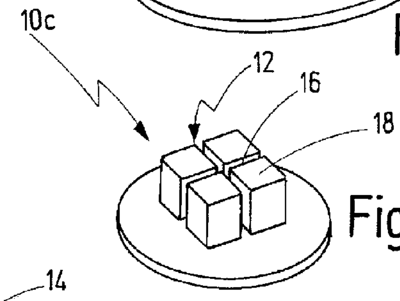
FIGS. 4 to 9 show further embodiments of a coil according to the invention where the coil body is assembled from separate segments of different shapes so that differently formed spaces are obtained for receiving one end of the cutting wire.

The coil 10*c* as illustrated in FIG. 4 comprises a coil body 12 composed of four cube-shaped segments 18 that are separated one from the other by slot-like openings 16 disposed between the segments.

Figure 5:
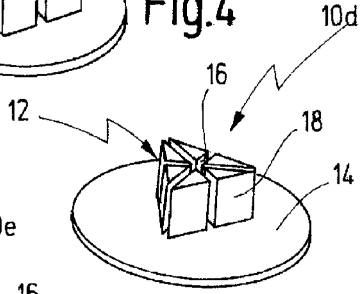

In the case of the embodiment according to FIG. 5, the coil 10*d* has a coil body 12 composed from triangular segments 18 that are separated one from the other by slot-shaped webs 16.

Figure 6:
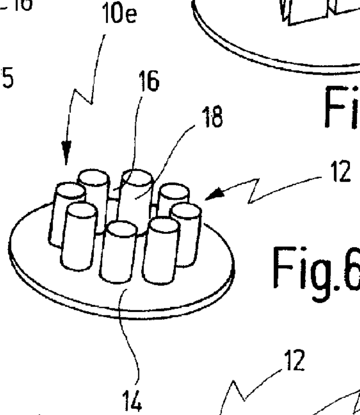

In the embodiment according to FIG. 6 the coil 10*e* has a total of eight cylindrical segments 18 arranged along a circle concentric to the axis of rotation 13. Between the neighboring segments 18, there are again formed spaces or openings 16 for introduction of one end of the cutting wire 19.

Figure 7:
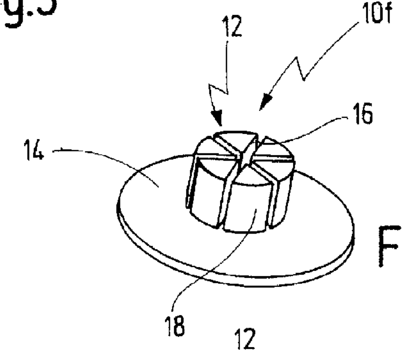

According to FIG. 7 the coil 10*f* has a cylindrical basic body, subdivided into six equal segments 18 by a total of three radially extending slots or openings 16.

Figure 8:
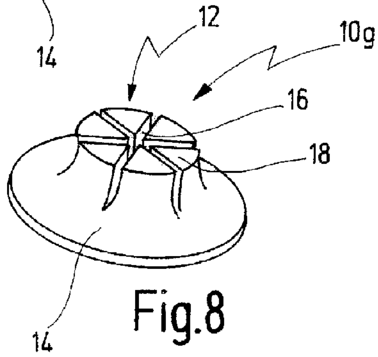

In the case of the embodiment according to FIG. 8 the coil 10*g* has a coil body 12 consisting again of six segments 18, subdivided by three slot-shaped openings 16. But contrary to the cylindrical basic shape of FIG. 7, the segments 18 get wider toward the disk-shaped flange 14 so that an oblique overall surface is obtained.

Figure 9:
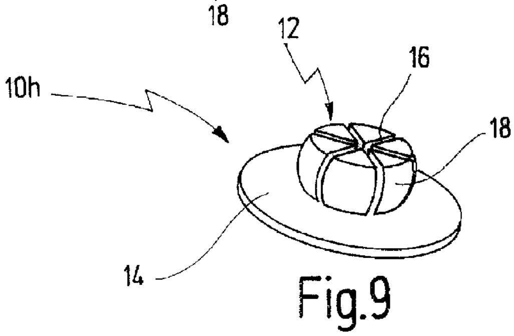

In the case of the embodiment of FIG. 9 the coil 10*h* comprises a coil body 12 with a rounded surface adapted to receive the wound-up material. That coil body is again subdivided into six equal segments 18 by three slot-shaped openings 16.

In all the before-mentioned illustrations of a coil according to the invention, the associated second disk-shaped flange according to the invention has been omitted for the sake of greater clarity.

It is understood that a great number of additional configurations of a coil body 12 are imaginable in addition to the illustrated embodiments. For example, the coil body need not be rotationally symmetrical, but may also be non-circular, for example oval.

The coil according to the invention is intended to be connected with a winding-up device for cutting through the adhesive bead of a vehicle pane. Such a winding-up device has been known, for example, from DE 10 2006 013 417 A1 which is incorporated herein in full by reference.

In order to cut through an adhesive bead the cutting wire is initially introduced into a gap between the pane and the frame on which the pane was fixed by bonding, is then guided around the adhesive bead, whereafter a first end of the cutting wire is fastened, and the second end of the cutting wire is passed through the adhesive bead and is fastened on a winding-up device. The adhesive bead is then cut through by the cutting wire as it is wound up on the coil.

It is understood that such a device, although being particularly well suited for cutting through the adhesive bead of windshields, can also be used for cutting through adhesive beads of any other panes of a kind used, for example, in buildings, railway trains, cableway cabins, aircraft and ships.

Figure 11:
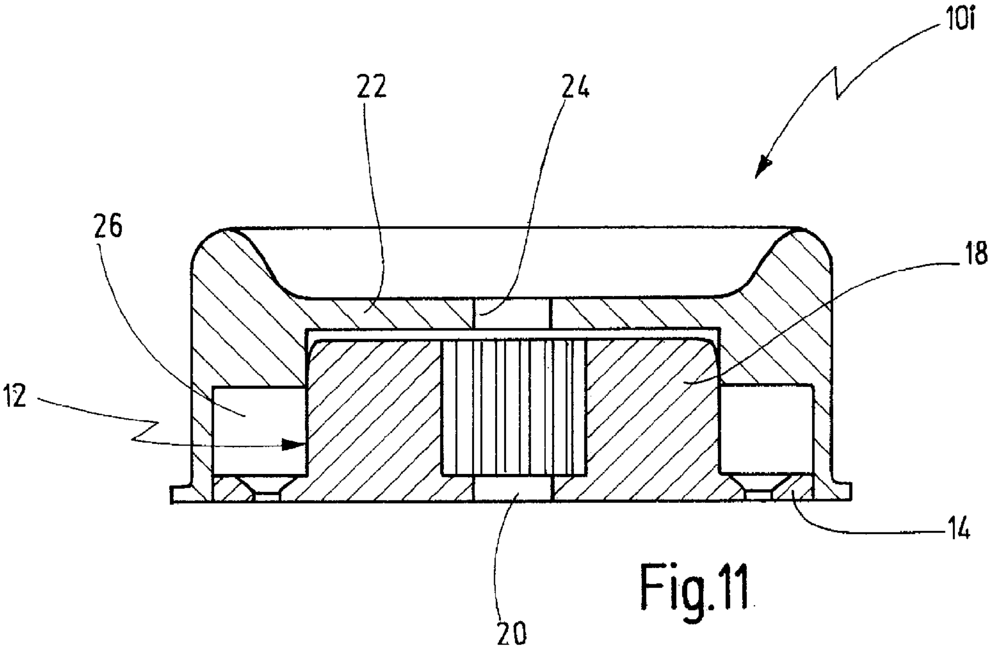
FIG. 11 shows a section through the coil according to FIG. 10.
Figure 10:
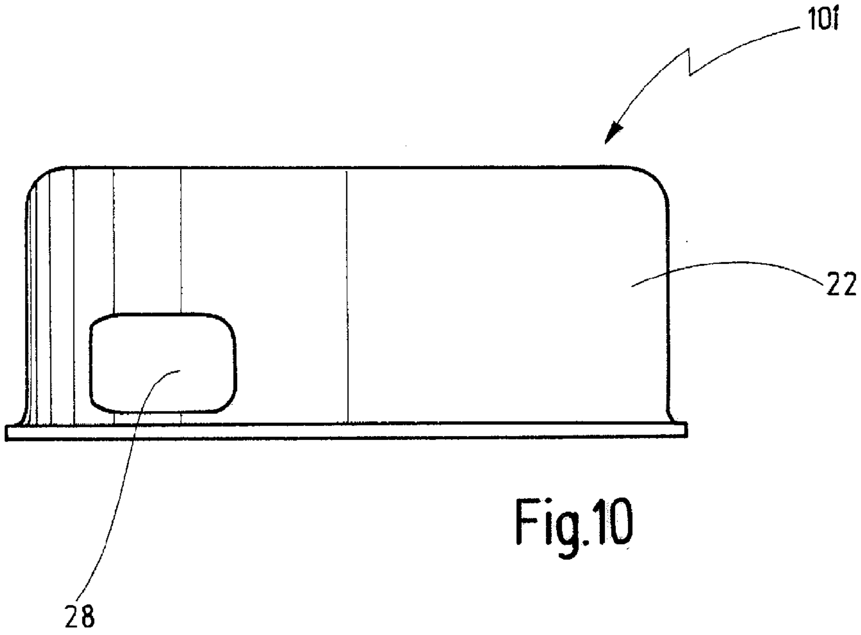
FIG. 10 shows a view of another embodiment of a coil according to the invention.

Another embodiment of the coil according to the invention is illustrated in FIGS. 10 and 11 and is indicated generally by 10*i*. In that case, there is provided a coil body 12 consisting of segments 18 of the form illustrated in FIG. 3. On its one end, the coil body 12 is formed integrally with the disk-shaped flange 14. Further, the coil body 12 comprises a detachable cover 22. Both the disk-shaped flange 14 and the cover 22 are passed by a central opening 20 or 24, respectively, to permit the coil 10*i* to be mounted on an associated coil axis (not shown). An annular coil chamber 26 formed between the segments 18, the disk-shaped flange 14 and the cover 22 serves to accommodate the wound-up cutting wire 19.

As can be seen in FIG. 10, an opening 28 disposed in the cover 22 permits the cutting wire 19 to be introduced into the coil chamber 26, or to be unwound from the coil chamber 26.

Figure 12:
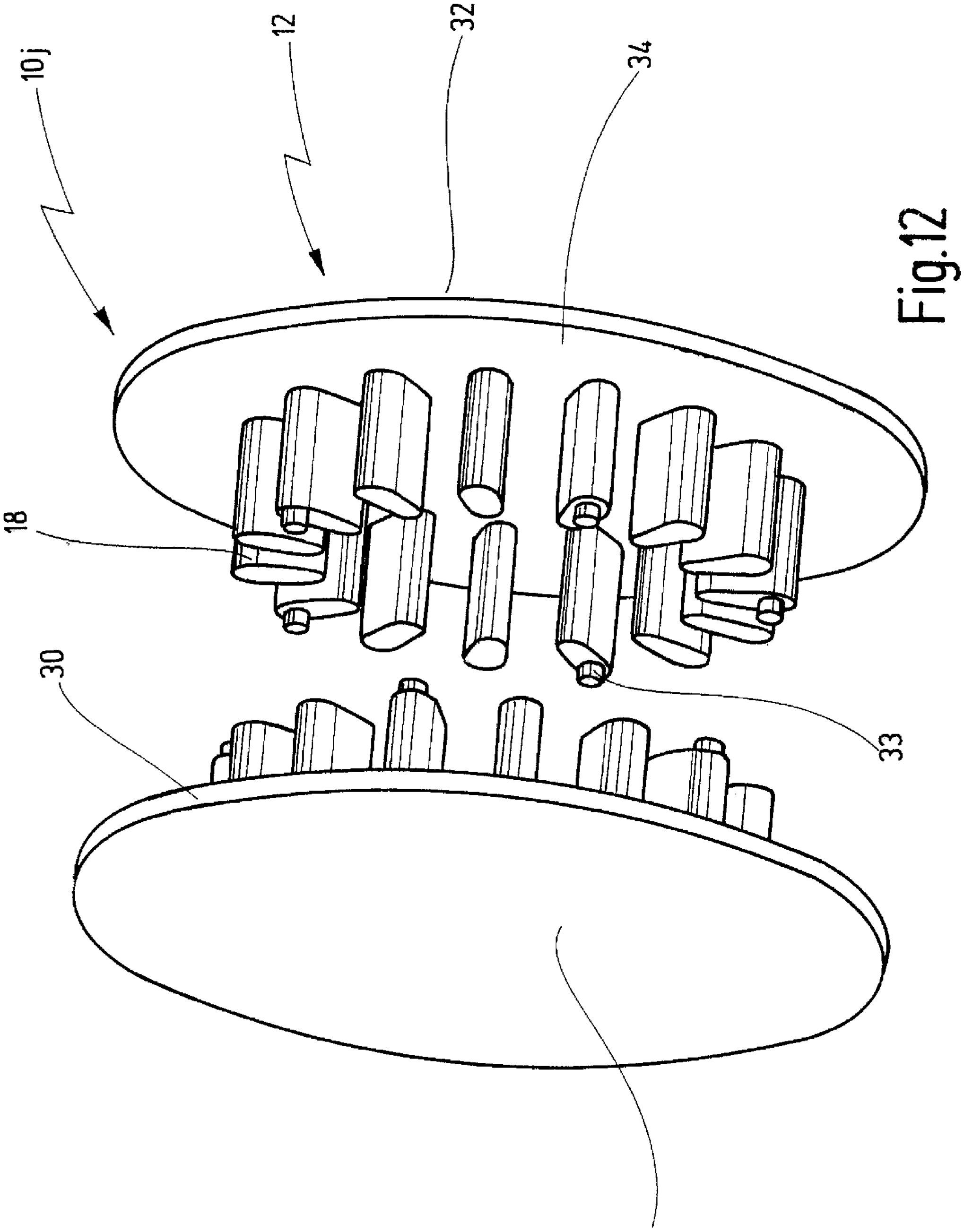
FIG. 12 shows an exploded view of two coil halves from which the coil is composed.

Another embodiment of a coil according to the invention, indicated generally by 10*j*, is shown in FIG. 12.

The coil 10*j* is composed from two parts 30, 32, each provided with segments 18 in the form known from FIG. 3. Both sides of the coil 10*j* are closed by a disk-shaped flange 14 or 34, respectively. The two parts 30, 32 are provided with matching centering elements 33 that engage in respective counter elements provided on the respective other part when the two parts 30, 32 are connected one with the other. A snap-in connection between the two parts, of a kind that will be described in more detail hereafter with reference to FIGS. 13 and 14 is, however, preferred.

Figure 13:
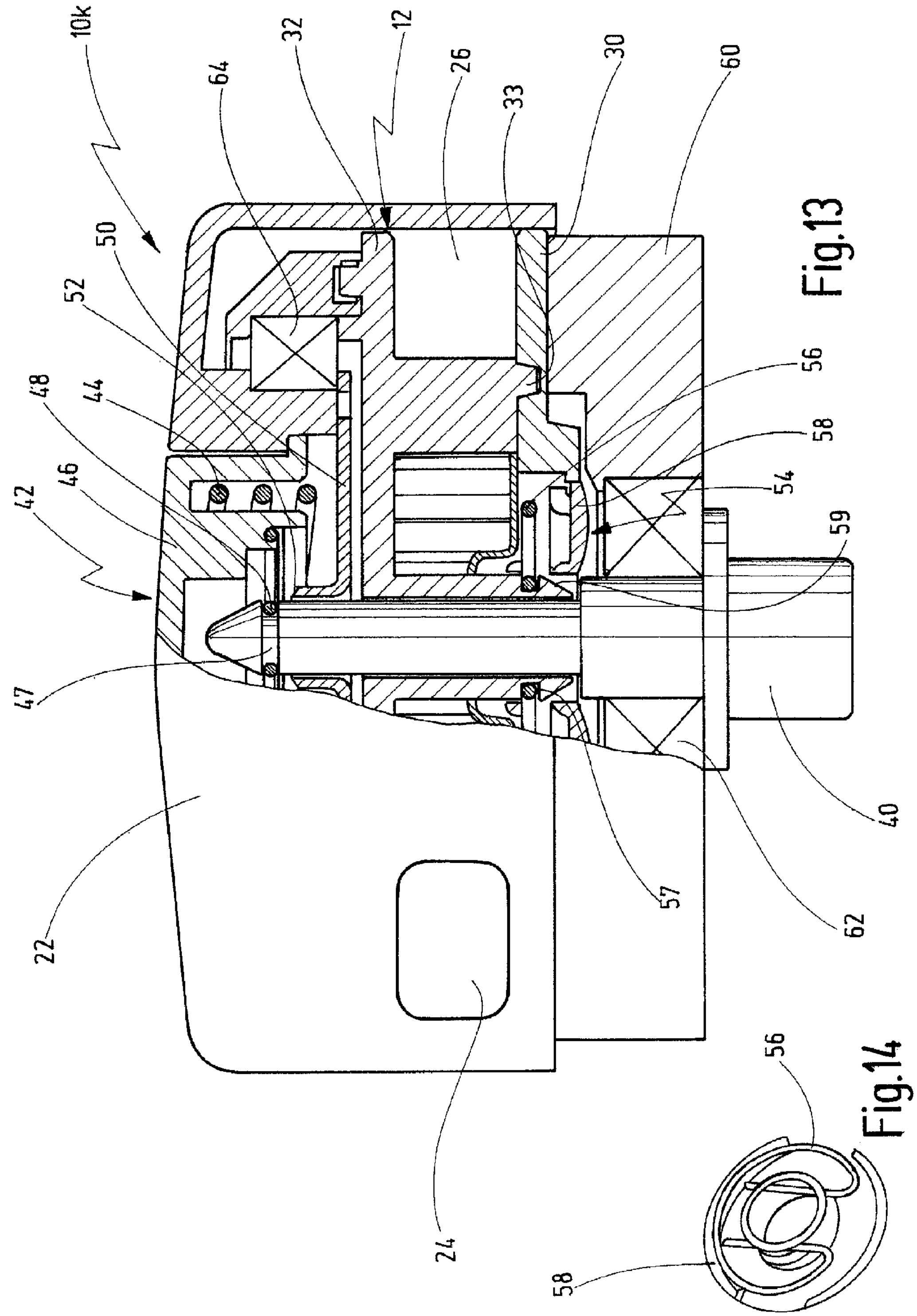
FIG. 13 shows a view, sectioned in part, of another embodiment of a coil according to the invention, showing a two-part design and provided with detent spring mechanisms intended to fix a cover and coil body on a coil axis.
Figure 14:
FIG. 14 shows a detail of the two retaining springs with an associated knob according to FIG. 13.

FIG. 13 shows an enlarged view of a coil of a two-part design indicated generally by 10*k* and comprising a coil body 12 with a removable cover 22. The coil 10*k* is seated on a coil axis 40 that can be firmly connected with the winding-up device (not shown) for being motor-driven as required.

A base 60 is rotatably mounted on the coil axis 40 via a bearing 62. Further, a coil body indicated generally by 12, with a cover 22 held on it, is removably mounted on the coil axis 40. The coil body 12 can be fixed on the coil axis 40 by a spring-loaded locking mechanism 42. One part 30 of the two-part coil body 12 is detachably fixed on the other part 32, again by a spring-loaded locking mechanism 54.

The structure of the two parts 30, 32 of the coil body 12 corresponds to the structure that has been described above with reference to FIG. 12. The two parts complement each other to form a common coil body 12 and are centered together by centering elements 33.

The part 30 and the part 32 again enclose between them an annular coil chamber 26 that serves to accommodate the wound-up cutting wire 19. The cover 22 again comprises an opening 24 through which the cutting wire 19 can be introduced into, and can be unwound from, the coil chamber 26.

The cover 22 is fixed on the coil body 12 and is rotatable relative to the coil axis 40 via a bearing 64.

The outer end of the coil axis 40 shows a conical configuration. That conical end is followed by a circumferential groove 47 which is engaged by a retaining spring 48 fixed on an associated knob 46. The knob 46 is a central, substantially pot-shaped part that is biased toward the outside and into a rest position by a spiral spring 44. When the knob 46 is pressed down, against the pre-stress of the spiral spring 44, the retaining spring 48 is released from the circumferential groove 47 and moves onto an associated inclined surface 52 of a retaining element fixed on the part 32 of the coil body 12.

The connection of the coil body 12 with the coil axis 40 is thereby released so that the coil body 12, together with the cover 22 held on it, can be removed from the coil axis 40. Thereafter, only the base 60 and the bearing 62 are left on the coil axis 40.

Once the coil body 12 has been removed from the coil axis 40, another knob 58 is accessible from the outside on the end of the coil body 12 that faces toward the bearing 62.

That knob 58 is part of a spring-loaded locking mechanism 54 by which the part 30 is fixed on the part 32 of the coil body 12.

The knob 58 with the associated retaining spring 56 is shown in detail in FIG. 14. The retaining spring 56 generally has a circular shape and comprises two legs that are bent off in parallel one to the other. These legs engage into a matching circumferential groove 57 at the end of the part 32 of the coil body 12. When the retaining spring 56 is moved toward the outer end of the coil 60*k*, by operation of the knob 58, the ends of the retaining spring 56 are released from the annular groove 57 so that the part 30 can now be removed from the part 32, which latter is connected with the cover 22. The cutting wire 19 can now be removed from the coil chamber 26. For assembling the coil, the two parts 30, 32 are assembled again, that operation being facilitated by the retaining spring 56 and the inclined plane 59. Once the ends of the spring element 56 enter the circumferential groove 47, snapping-in or locking occurs. Now, the entire unit can be mounted on the coil axis 40 and can again be locked in place by the spring-loaded locking mechanism 42.

The retaining spring 48 has a form corresponding to that of the retaining spring 56. Here again, locking occurs as soon as the two ends of the retaining spring 48 engage the circumferential groove 47.

What is claimed is:

1. A winding-up device for cutting through an adhesive bead of a bonded-on pane of a vehicle comprising cutting wire and a coil configured for winding up the cutting wire configured for cutting through said adhesive bead, said coil comprising:

a coil body for winding up said cutting wire wherein the coil body has a perimeter;

a plurality of openings provided on said coil body and being configured for securing one end of said cutting wire, said plurality of openings each having a width large enough to permit the cutting wire to be introduced and small enough so that the cutting wire will be bent off outside the perimeter of the coil body to hold the cutting wire on the coil body;

a coil axis on which said coil body is detachably fastened;

a cover detachably fastened on said coil axis, the cover having an opening that permits the cutting wire to be introduced into the coil body and rotatable relative to the coil axis;

a first spring-loaded locking mechanism provided on said coil body for securing said cover;

a second spring-loaded locking mechanism provided on said coil axis for fixing said coil body on said coil axis;

wherein said first and second locking mechanisms are adapted so that said coil body is detachable from said coil axis together with said cover.

2. The winding-up device of claim 1, wherein said coil body consists of at least two parts that are detachably connected one with the other.

3. The winding-up device of claim 2, wherein said first and second locking mechanisms are adapted so that the two parts of said coil body can be released one from the other after having been released from said coil axis.

4. The winding-up device of claim 1 wherein the winding-up device is motor driven.

5. The winding-up device of claim 1 further comprising:

a first knob adapted to release said first locking mechanism; and a second knob adapted to release said second locking mechanism;

wherein said first knob is not accessible until the coil body has been removed from the coil axis.

6. A winding-up device for cutting through an adhesive bead of a bonded-on pane of a vehicle comprising cutting wire and a coil configured for winding up the cutting wire configured for cutting through said adhesive bead, said coil comprising:

a coil body for winding up said cutting wire wherein the coil body has a perimeter;

a plurality of openings provided on said coil body and being configured for securing one end of said cutting wire, said plurality of openings each having a width large enough to permit the cutting wire to be introduced and small enough so that the cutting wire will be bent off outside the perimeter of the coil body to hold the cutting wire on the coil body; and a cover being detachably fastened over said coil body on a coil axis so that said coil body is detachable from said coil axis together with said cover;

wherein said coil body further comprises two flanges arranged on said coil axis spaced from each other that commonly define a coil chamber configured for receiving said cutting wire when winding up on said coil;

wherein said coil body is secured to said coil axis detachably by a spring-loaded locking mechanism;

wherein the cover has an opening that permits the cutting wire to be introduced into the coil chamber and is rotatable relative to the coil axis.

7. The winding-up device of claim 6, wherein said plurality of openings is configured as a cylindrical bore or as a slot.

8. The winding-up device of claim 6, wherein said coil body comprises a plurality of segments which commonly form an outer contour configured for receiving said cutting wire when winding up on said coil, at least one space being formed between said segments.

9. The winding-up device of claim 8, wherein said coil body comprises:

an axis of rotation; and a plurality of web-shaped segments that are arranged, in radial direction, at equal angular spacings one relative to the other along a circle concentric to said axis of rotation.

10. The winding-up device of claim 6, further comprising a first spring-loaded locking mechanism provided on said coil body for securing said cover, and further comprising a second spring-loaded locking mechanism provided on said coil axis for fixing said coil body on said coil axis.

11. The winding-up device of claim 10, wherein said first and second locking mechanisms are adapted so that said coil body is detachable from said coil axis together with said cover.

12. The winding-up device of claim 11, wherein said locking mechanisms that serve to fix said coil body and said cover on said coil axis coact in such a way that the two-part coil body can be opened after having been released from the coil axis.

13. The winding-up device of claim 6 wherein the winding-up device is motor driven.

14. The winding-up device of claim 10 further comprising:

a first knob adapted to release said first locking mechanism; and a second knob adapted to release said second locking mechanism;

wherein said first knob is not accessible until the coil body has been removed from the coil axis.

15. A winding-up device for cutting through an adhesive bead of a bonded-on pane of a vehicle and a cutting wire configured for cutting through said adhesive bead, said winding-up device comprising:

a coil axis;

a cartridge secured on said coil axis detachably by a spring-loaded locking mechanism;

a cover attached over said cartridge so that said cartridge is detachable from said coil axis together with said cover;

wherein said cartridge comprises a coil body having a plurality of openings wherein the coil body has a perimeter and said cutting wire wound onto said coil body and having one end that is secured in at least one of said plurality of openings of said coil body, said plurality of openings each having a width large enough to permit the cutting wire to be introduced and small enough so that the cutting wire will be bent off outside the perimeter of the coil body to hold the cutting wire on the coil body;

wherein the cover has an opening that permits the cutting wire to be introduced into a coil chamber and is rotatable relative to the coil axis.

16. The winding-up device of claim 15, wherein said coil body comprises a plurality of segments which commonly form an outer contour configured for receiving the wound-up cutting wire and between which at least one space is formed.

17. The winding-up device of claim 15, wherein said coil body comprises a plurality of web-shaped segments that are arranged, in radial direction, at equal angular spacings one relative to the other along a circle concentric to the axis of rotation.

18. The winding-up device of claim 15, further comprising:

a first spring-loaded locking mechanism provided on said coil body for securing said cover; and a second spring-loaded locking mechanism provided on said coil axis for fixing said coil body on said coil axis;

wherein said first and second locking mechanisms are adapted so that said cartridge is detachable from said coil axis together with said cover.

19. The winding-up device of claim 18 further comprising:

a first knob adapted to release said first locking mechanism; and a second knob adapted to release said second locking mechanism;

wherein said first knob is not accessible until the coil body has been removed from the coil axis.

20. The winding-up device of claim 15 wherein the winding-up device is motor driven.

* * * * *